US008521920B2

(12) United States Patent
Nito et al.

(10) Patent No.: US 8,521,920 B2
(45) Date of Patent: Aug. 27, 2013

(54) DATA PROCESSOR

(75) Inventors: Takumi Nito, Kokubunji (JP); Masashi Takada, Kokubunji (JP); Tetsuya Yamada, Sagamihara (JP)

(73) Assignee: Renesas Electronics Corporation, Kanagawa (JP)

( * ) Notice: Subject to any disclaimer, the term of this patent is extended or adjusted under 35 U.S.C. 154(b) by 39 days.

(21) Appl. No.: 12/844,071

(22) Filed: Jul. 27, 2010

(65) Prior Publication Data

US 2011/0055435 A1    Mar. 3, 2011

(30) Foreign Application Priority Data

Aug. 27, 2009    (JP) .................................. 2009-196369

(51) Int. Cl.
*G06F 13/28*    (2006.01)

(52) U.S. Cl.
USPC .......................................................... 710/22

(58) Field of Classification Search
USPC .......................................................... 710/22
See application file for complete search history.

(56) References Cited

U.S. PATENT DOCUMENTS

| 6,970,982 B2 * | 11/2005 | Altman et al. ................ 711/141 |
| 7,681,044 B2 * | 3/2010 | Goto .............................. 713/190 |
| 2009/0327647 A1 * | 12/2009 | Ingle et al. ..................... 711/207 |

FOREIGN PATENT DOCUMENTS

| JP | 10-289194 A | 10/1998 |
| JP | 2004-334410 A | 11/2004 |
| JP | 2008-102850 A | 5/2008 |
| JP | 2010-79765 A | 4/2010 |

* cited by examiner

*Primary Examiner* — Idriss N Alrobaye
*Assistant Examiner* — Dayton Lewis-Taylor
(74) *Attorney, Agent, or Firm* — Mattingly & Malur, PC

(57) ABSTRACT

The data processor with access protection which has higher reliability during data transfer control according to a transfer condition set by a CPU. The data processor has: a CPU; a memory management section operable to control data transfer by the CPU; and a transfer controller operable to control the data transfer. The transfer controller holds identification information which the memory management section uses for access protection. When producing an address for transfer according to the setting of the CPU, the transfer controller starts data transfer on the condition that the identification information corresponding to the address for transfer matches the identification information of the CPU at the setting of a transfer condition, etc.

8 Claims, 8 Drawing Sheets

| ENTRY | 1 | 2 | .... | N |
|---|---|---|---|---|
| VIRTUAL ADDRESS | | | | |
| PHYSICAL ADDRESS | | | | |
| PAGE SIZE | | | | |
| CACHE ATTRIBUTE | | | | |
| OPERATING MODE ACCESS AUTHORITY | | | | |
| PROCESS ID | | | | |
| DOMAIN ID | | | | |
| ... | | | | |

300, 301

DATA PROCESSOR

CLAIM OF PRIORITY

The Present application claims priority from Japanese application JP 2009-196369 filed on Aug. 27, 2009, the content of which is hereby incorporated by reference into this application.

FIELD OF THE INVENTION

The present invention relates to a data processor, particularly to an access protection mechanism by means of DMAC (Direct Memory Access Controller) incorporated in a data processor, and to a technique useful in application to, e.g., a microcomputer unit in a single chip form.

BACKGROUND OF THE INVENTION

In regard to today's data processors, especially microcomputers for use with embedded devices, a technique having the following feature has been used: a central processing unit, hereinafter referred to as "CPU", in charge of general-purpose processing, and a plurality of peripheral IP cores for specially designed processing are formed in one chip, and a processor so fabricated is used to build a system such that a plurality of application software programs can work. In a system so constructed, one main memory region is divided into a number of areas, and two or more software programs use the areas.

An originally unintended access from CPU in a data processor to a memory region which a software program is using may be made owing to, e.g., a bug of software origin, a bug of hardware origin, a temporary hardware trouble (involved with, e.g., a software error caused by alpha rays), and a malicious software program. Such access is hereinafter referred to as "unauthorized address-access". Particularly, a product failure attributed to a bug of software origin often becomes a problem in embedded device applications.

Required to prevent such unauthorized address-access from exerting an adverse effect on another software program is a device which sets a range of accessible addresses to block an unauthorized address-access for each software program. In general, a software program executed by CPU, MMU (Memory Management Unit) performs: a memory management by means of a virtual memory; an address translation from a virtual address on a process space into a physical address on the main memory; and a block of an unauthorized address-access, hereinafter referred to as "access protection". The access protection is performed based on a virtual address, and identification information including an operating mode of CPU handling it, a process identifier for identifying a process of a software program run by CPU, hereinafter referred to as "process ID", and a domain identifier for identifying a software program of upper hierarchic level which manages the execution of the program, hereinafter referred to as "domain ID".

However, in a system with DMAC, DMAC is located outside a processor core including CPU and MMU, the setting of an address, etc. is performed based on a request for an access from CPU or the like, and the access is executed based on them. Therefore, in such a system, the access protection by MMU does not work against the access. A DMAC technique for access protection against an access is disclosed in Japanese Unexamined Patent Application Publications JP-A-2004-334410, JP-A-2008-102850, and JP-A-10-289194, for example.

In the data processor disclosed by JP-A-2004-334410, an unauthorized-address-access-block mechanism is placed inside a control circuit module located on a bus between a bus master device, such as CPU or DMAC and a slave device, such as a main memory, or on address and control lines between the bus master device and the bus. The unauthorized-address-access-block mechanism has a previously set range of addresses within which an access from the bus master device to the slave device is permitted. At time of access by the bus master device, the unauthorized-address-access-block mechanism judges whether an address of interest which is output by the bus master device is included in the address range, thereby to block an unauthorized address-access.

The invention disclosed by the second cited reference JP-A-2008-102850 relates to a system having CPU, MMU and an external device which handles part of a process of a software program executed by CPU in place of CPU, wherein the external device has DMAC. When handling part of a process of the software program as a substitute, the external device uses DMAC to read data required for the processing, and to write the resultant data. When setting a transfer condition on DMAC, the external device acquires physical addresses corresponding to virtual addresses of the source and destination of transfer, and information concerning a authority of access, and then judges whether an access of interest is authorized or not.

In a system including CPU, MMU and DMAC, which is disclosed by the third cited reference JP-A-10-289194, a combination of transfer source and destination on which data transfer can be conducted is previously set on DMAC as resource select information. In data transfer, DMAC judges whether or not information of addresses of transfer source and destination associated with a data transfer request from CPU matches the resource select information, and conducts access protection depending on a result of the judgment.

SUMMARY OF THE INVENTION

Although in the data processor disclosed by JPA-2004-334410, the unauthorized-address-access-block mechanism provides an access protection based on the address range, the access protection is not an access protection of a higher reliability achieved based on identification information including a CPU operating mode, a process ID and a domain ID. In addition, with the system disclosed by JP-A-2008-102850, DMAC has no identification information including the operating mode of CPU, a process ID and a domain ID, and therefore there is no guarantee that access protection is afforded to the whole address range set on DMAC. That is, access protection is not necessarily offered to all of the addresses whose range is specified because access protection is provided to an address directly set on DMAC. Further, JP-A-10-289194 requires that the setting of access protection should be made on a member other than MMU, leading to an increase of the software-related cost.

Therefore, it is an object of the invention to provide a data processor which can provide access protection with higher reliability in data transfer control according to a transfer condition set by CPU.

The above and other objects of the invention, and novel features thereof will become apparent from the description hereof and the accompanying drawings.

Of embodiments of the invention herein disclosed, a representative will be outlined in brief below.

Materialized according to the embodiment is a data processor, in which a transfer controller having control of data transfer holds identification information utilized for access protection with a memory management section. In the step of producing an address for transfer according to a setting of CPU, the transfer controller begins a transfer start action on condition that identification information corresponding to the address for transfer matches identification information of CPU at the setting of a transfer condition.

The effect achieved by the representative embodiment of the invention is briefly as follows.

In data transfer control according to a transfer condition set by CPU, access protection can be provided with higher reliability.

DETAILED DESCRIPTION OF THE PREFERRED EMBODIMENTS

Figure 1:
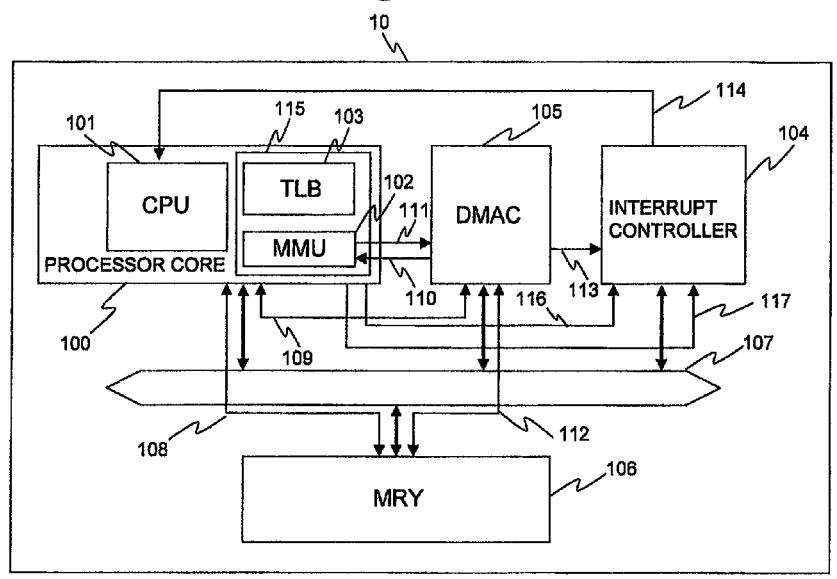
FIG. 1 is a block diagram of a data processor 10 according to the first embodiment of the invention.

1. Brief Description of the Preferred Embodiments

The preferred embodiments of the invention herein disclosed will be outlined first. Now, it is noted that the reference numerals and the likes for reference to the drawings, which are accompanied with paired round brackets here, only exemplify what the concepts of parts or components referred to by the numerals, characters and signs contain.

[1] A data processor (10, 20, 30) according to a preferred embodiment of the invention has: a central processing unit (101) operable to run a software program; a memory management section (115) for address translation from a virtual address in a virtual address space of the central processing unit into a physical address, and for access protection; and a transfer controller (105, 105A, 105B, 700) operable to control data transfer according to transfer control information set by access from the central processing unit. The memory management section has an address translation buffer (103) for holding a plurality of sets of translation entry data (300), each set including an address translation data pair used in address translation, and identification information for identifying a process of a software program using a virtual address corresponding to the address translation data pair. The transfer controller has an identification-information-memory unit (404) for holding identification information for identifying a process of a software program which the central processing unit is running at time of setting the transfer control information thereon. A prerequisite for start of data transfer is that at the time of producing a physical address of a transfer target according to the transfer control information, identification information corresponding to the physical address matches identification information in the identification-information-memory unit. According to the embodiment, each time a physical address is produced, the transfer controller confirms that identification information corresponding to a physical address in question matches identification information of the central processing unit at the time of setting a transfer condition. Therefore, it is possible to achieve a highly reliable access protection. In other words, an access protection according to set transfer conditions can be provided for all of the addresses associated with data transfer.

[2] In regard to the data processor as described in [1], the identification information includes a process identifier for identifying a process of a software program run by the central processing unit. According to the embodiment, an access protection is performed based on identification information for each process. Therefore, an access protection can be performed with higher reliability.

[3] In regard to the data processor as described in [2], the identification information includes a domain identifier for identifying a software program of upper hierarchic level in charge of management of the run of the program. According to the embodiment, an access protection is performed based on identification information for each process and identification information for each domain. Therefore, an access protection can be performed with higher reliability.

[4] In regard to the data processor as described in [2] or [3], the identification information further includes an operating mode identifier showing whether an operating mode of the central processing unit is Privileged Mode or User Mode. According to the embodiment, an access protection is conducted based on the operating mode as well as identification information for each process and identification information for each domain. Therefore, an access protection can be performed with higher reliability.

[5] In regard to the data processor as described in [1], the transfer controller has an address translation sub-buffer (405) used at the time of producing a physical address of a transfer target according to the transfer control information, and the address translation sub-buffer holds a subset of information kept by the address translation buffer. According to the embodiment, the transfer controller uses a subset of the identification information which the memory management section uses for access protection to conduct an access protection. Therefore, an access protection can be performed with the same high level of reliability as achieved by the memory management section.

[6] In regard to the data processor as described in [5], on condition that the address translation sub-buffer does not have the translation entry data required when the transfer controller produces a physical address of a transfer target according to the transfer control information, the transfer controller makes a request to the memory management section for the required translation entry data, and then the memory management section provides the transfer controller with the translation entry data in response to the request. According to the embodiment, a subset of the identification information can be set on the address translation sub-buffer readily.

[7] A data processor according to another preferred embodiment has more than one set of a central processing unit, a memory management section and a transfer controller (100A, 105A, 100B, 105B), which are identical with those of the data processor as described in [1] in function. In the data processor, each central processing unit is allowed to set the transfer control information only on the transfer controller belonging to the same set as the unit per se. According to the embodiment, even with a system having more than one set of a central processing unit, a memory management section and a transfer controller, the same effect as the data processor as described in [1] brings about can be achieved.

[8] A data processor according to another preferred embodiment has more than one set of a central processing unit and a memory management section (100C, 100D), and a transfer controller (700) shared by the central processing unit and memory management section, provided that the central processing unit, memory management section and transfer controller are identical with those of the data processor as described in [6]. In the data processor, at time of producing a physical address of a transfer target according to the transfer control information, the transfer controller holds identification information of the central processing unit which has set the transfer control information on the transfer controller and if the address translation sub-buffer does not have the required translation entry data, makes a request for the required translation entry data to the memory management section of the set which the central processing unit corresponding to the identification information belongs to. According to the embodiment, even with a system in which more than one set of a central processing unit and a memory management section share one transfer controller, the same effect as the data processor as described in [6] brings about can be achieved.

[9] A data processor (40) according to a preferred embodiment of the invention has: a central processing unit operable to run a software program; a controller (501) operable to control data transfer according to transfer control information set by access from the central processing unit; and an access protection device (504) connected with a circuit (106) targeted for access and placed in an address space of the central processing unit. The access protection device has a translation buffer (502) for holding more than one information pair of an address and identification information for identifying a process of a software program using the address. An access to the circuit (106) targeted for access is permitted on condition that identification information of the information pair corresponding to an address output from the transfer controller according to the transfer control information matches the identification information output accompanying the address. According to the embodiment, the access protection device performs an access control based on the identification information. Therefore, an access control with higher reliability can be achieved even if the transfer controller has no access protection mechanism.

[10] In regard to the data processor as described in [9], the identification information includes a process identifier for identifying a process of a software program run by the central processing unit. According to the embodiment, an access control is performed based on identification information for each process. Therefore, an access control with higher reliability can be achieved.

[11] In regard to the data processor as described in [10], the identification information includes a domain identifier for identifying a software program of upper hierarchic level in charge of management of the run of the program. According to the embodiment, an access control is performed based on identification information for each process and identification information for each domain. Therefore, an access control with higher reliability can be achieved.

[12] In regard to the data processor as described in [10] or [11], the identification information further includes an operating mode identifier showing whether an operating mode of the central processing unit is Privileged Mode or User Mode. According to the embodiment, an access control is conducted based on the operating mode as well as identification information for each process and identification information for each domain. Therefore, an access control with higher reliability can be achieved.

2. Further Detailed Description of the Preferred Embodiments

Now, the embodiments will be described further in detail.

First Embodiment

FIG. 1 shows a data processor according to the first embodiment of the invention, and it is material to a single-chip microcomputer. Although no special restriction is intended, the data processor 10 shown in the drawing is formed on a substrate of semiconductor, such as monocrystalline silicon, by the known manufacturing techniques for manufacturing CMOS ICs.

The data processor 10 includes: a processor core 100; a transfer controller 105, hereinafter referred to as "DMAC" for short; an interrupt controller 104; a main memory 106; and a system bus 107, and these blocks are connected to the system bus 107. Although this is not shown in the drawing, the system bus 107 is connected with, e.g., an I/O circuit and other peripheral circuits.

The processor core 100 includes a central processing unit 101, hereinafter referred to as "CPU" for short, and a memory management section 115. Further, the memory management section 115 has an MMU 102 and an address translation buffer 103. The address translation buffer is hereinafter referred to as "TLB" which stands for Translation Lookaside Buffer.

CPU 101 executes two or more software programs, which are different in their accessible address ranges, and each have a combination of an operating mode, a process ID and a domain ID. The operating mode is used to discriminate between a software program of upper hierarchic level and a user program. For example, the operating mode of a program of an operating system, which is a software program of upper hierarchic level, is shown as "Privileged" mode, and that of a user program is shown as "User" mode. The domain ID helps to identify a software program of upper hierarchic level which manages and controls the execution of the software programs by CPU 101. The domain ID is used to discriminate among two or more operating systems which are working in parallel; a domain ID number is assigned to each operating system. The process ID is used to discriminate user programs running on the same operating system, and each user program is assigned a process ID number. A combination of these kinds of information, i.e., an operating mode, a domain ID and a process ID, is herein defined as "identification information" to identify a process by a program that CPU 101 is running.

Figure 2:
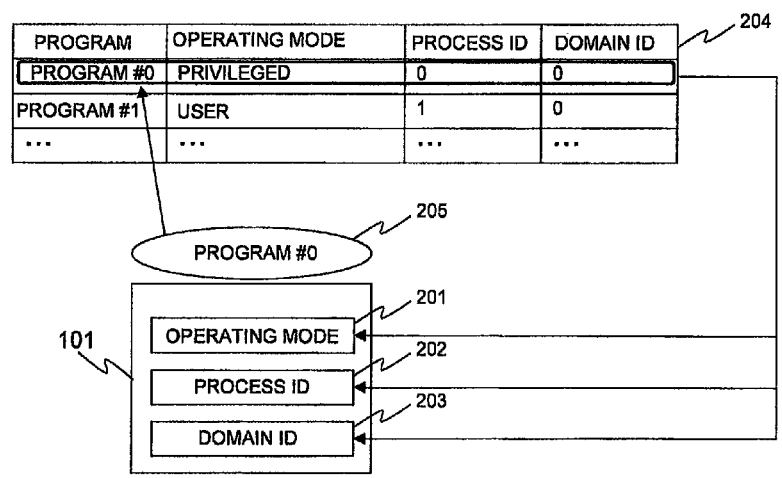
FIG. 2 is a table showing examples of the correspondence between each software program executed by CPU 101 involved with the first embodiment, and the operating mode, process ID and domain ID thereof.

FIG. 2 shows examples of the correspondence between each software program executed by CPU 101 and its operating mode, process ID and domain ID. For instance, it is seen from the part 204 of the table of FIG. 2, which shows the identification information for each program executed by CPU 101, that the program #0 is classified as Privileged Mode in its operating mode, and is allotted "0" as its process ID and domain ID, and the program #1 is classified as User Mode in its operating mode, and is allotted "1" as its process ID, and "0" as its domain ID. As shown in FIG. 2, CPU 101 has registers for storing the identification information. When running the program #0 denoted by the reference numeral 205, for example, CPU 101 stores the operating mode, process ID and domain ID in the registers 201, 202 and 203.

TLB 103 holds information, hereinafter referred to as "translation entry data", which includes: an address translation data pair used for address translation from a virtual address into a physical address; and management information of a virtual page corresponding to the address translation data pair. TLB 103 is formed as an associative memory. The management information of the virtual page includes the identification information as described above.

Figures 3, 4:
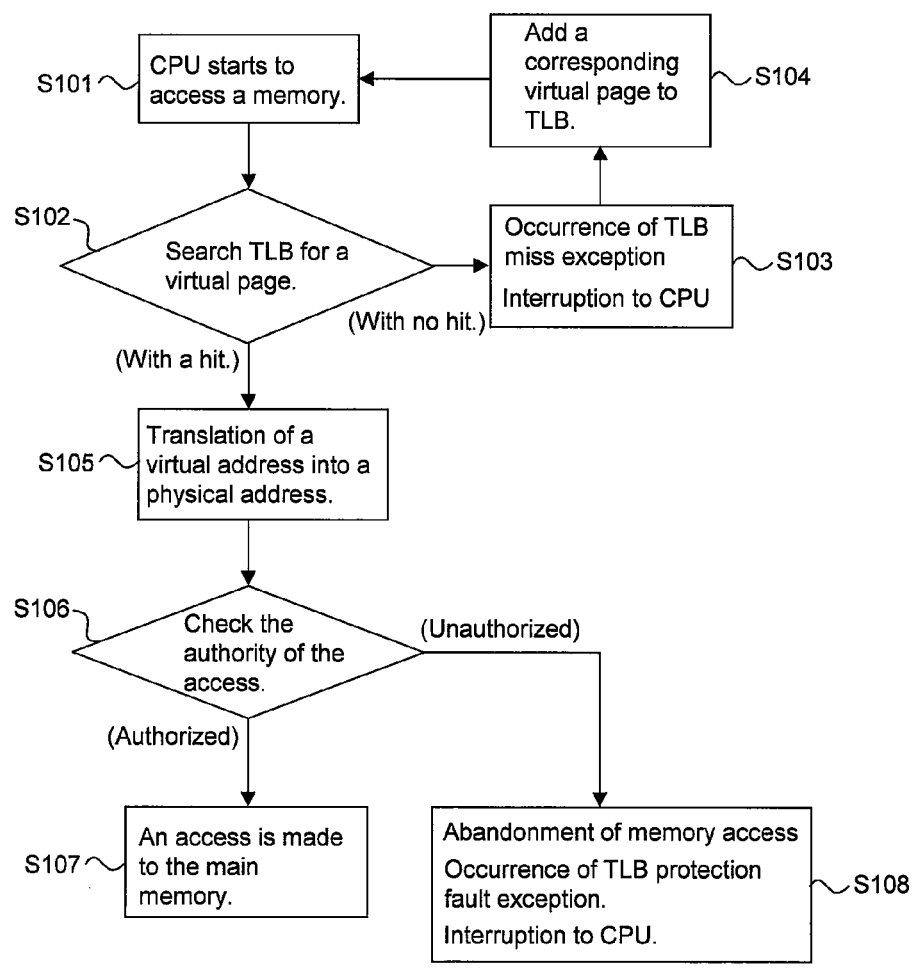
FIG. 3 is a diagram showing an example of translation entry data stored in TLB 103 involved with the first embodiment.
FIG. 4 is a flowchart of access to a main memory 106 by CPU 101 involved with the first embodiment.

FIG. 3 shows an example of the translation entry data stored in TLB 103. As shown in FIG. 3, e.g., a pair of a virtual address and a physical address forming the address translation data pair, and virtual page's management information 301 corresponding to the translation data pair are stored as a set of translation entry data 300. The virtual page's management information 301 includes, in addition to the page size of a virtual page, and a cache attribute showing whether to make a cache valid, a combination of the operating mode access authority, process ID and domain ID, which makes the identification information.

In response to a request for an access to the main memory 106 of CPU 101, MMU 102 controls the access. The general information of an operation of MMU 102 will be presented here in detail with reference to FIG. 4.

FIG. 4 is a flowchart of access to the main memory 106 by CPU 101.

First, CPU 101 makes a request for an access to the main memory 106 (S101). MMU 102 receives a virtual address in response to the access request from CPU 101. MMU 102 uses part of the virtual address as an index and searches for translation entry data of a virtual page corresponding to the virtual address, which is stored in TLB 103 (S102). If TLB 103 does not include the required translation entry data, MMU 102 provides an interrupt request 116 to the interrupt controller 104 for the purpose of creating a TLB miss exception, and the interrupt controller 104 uses an interrupt signal 114 to make an interruption on CPU 101 (S103). At the interruption, CPU 101 is notified of a factor of the interruption. CPU 101, which has received the interrupt signal 114, accesses, e.g., the main memory 106, and stores, in TLB 103, required translation entry data of a corresponding virtual page (S104). On the other hand, if TLB 103 holds the required translation entry data, MMU 102 uses the translation entry data to translate the virtual address into a physical address (S105). At the address translation, MMU 102 compares the identification information corresponding to the resultant physical address with identification information stored in the registers 201 to 203 of CPU 101 thereby to check whether the access concerned is authorized or not (S106). If it is judged that the access will not lead to a violation of access authority, MMU 102 outputs the physical address resulting from the translation, identification information, etc. to the system bus 107 (S107). However, if it is judged that the access will result in a violation of access authority, MMU 102 sends an interrupt request 117 to the interrupt controller 104 in order to create a TLB protection fault exception. On receipt of the interrupt request 117, the interrupt controller 104 provides the interrupt signal 114 to CPU 101 to notify of occurrence of an access authority violation. In response to the notification, CPU 101 executes a predetermined exception process, and thus the access is abandoned (S108).

Next, DMAC 105 will be described.

Figure 5:
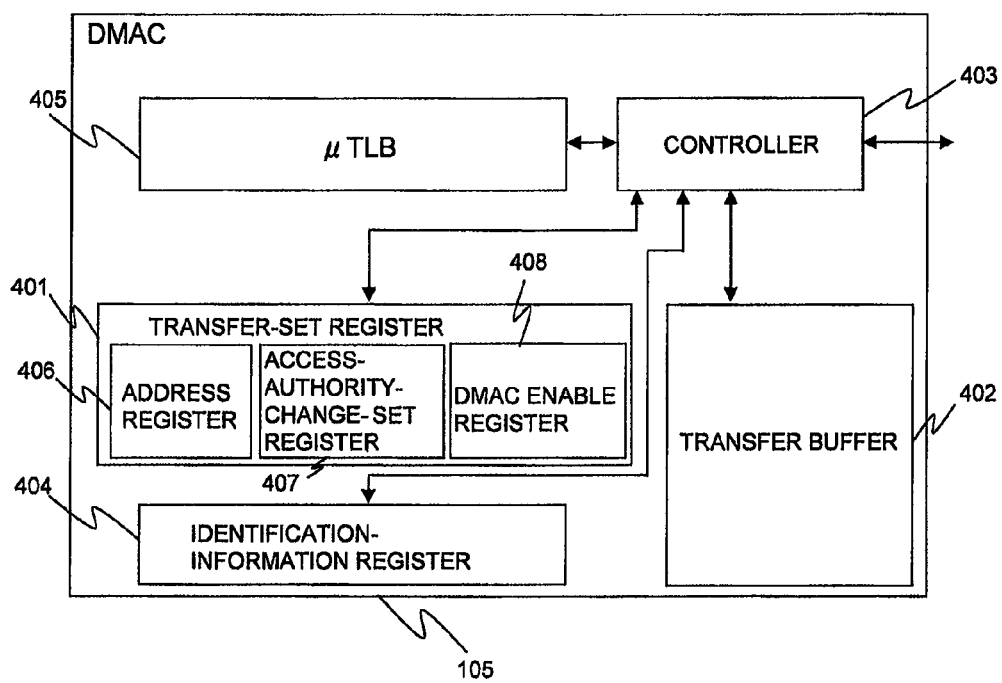
FIG. 5 is a block diagram showing the inside structure of DMAC 105 involved with the first embodiment.

FIG. 5 is a block diagram showing the inside structure of DMAC 105. DMAC 105 has a transfer-set register 401, a transfer buffer 402, a controller 403, an identification-information register 404 and a micro TLB 405. Further, the transfer-set register 401 includes an address register 406, an access-authority-change-set register 407, and a DMAC enable register 408.

In case of requesting data transfer from DMAC 105, CPU 101 provides transfer control information—a transfer condition—to DMAC 105 through the system bus 107 thereby to set the transfer condition on the address register 406 inside the transfer-set register 401. Incidentally, the transfer control information includes addresses of transfer source and destination, and a unit word length of transferred data. At the time of the setting, the controller 403 makes the setting on the access-authority-change-set register 407 to show whether or not to change the data-transfer authority of DMAC 105. For instance, in a case that a user program has a program of an operating system substitute for itself to set a transfer condition on DMAC 105 and start the transfer action, an enable bit is set on the access-authority-change-set register 407, which shows that the operating mode included in the identification information captured in the identification-information register 404, which will be described later, should be changed from Privileged Mode to User Mode.

After having set the transfer condition, CPU 101 sets, on the DMAC enable register 408, a start bit which indicates the start of transfer by DMAC 105, whereby DMAC 105 is activated. In this step, the controller 403 stores the identification information of CPU 101 at the time of setting the start bit in the identification-information register 404. If the enable bit has been put in the access-authority-change-set register 407 at this time, the operating mode included in the identification information captured in the identification-information register 404 is changed from Privileged Mode to User Mode. In other words, the operating mode needs to be changed from Privileged Mode to User Mode because the operating system program sets the transfer condition on DMAC 105 in Privileged Mode, and this condition is set on the identification-information register 404.

The micro TLB 405 holds a subset of the translation entry data stored in TLB 103 and makes an associative memory.

As described above, when the start bit is set on the DMAC enable register 408, DMAC 105 starts to transfer data. The controller 403 searches for translation entry data corresponding to a virtual address of interest, which is stored in the micro TLB 405, based on a virtual address set as a condition by CPU 101 and performs the translation of the address. Further, the controller 403 compares the identification information corresponding to the virtual address of interest with identification information stored in the identification-information register 404, and performs the access protection if required according to the result of the comparison. The access protection mechanism will be described with reference to FIG. 6 in detail.

Figure 6:
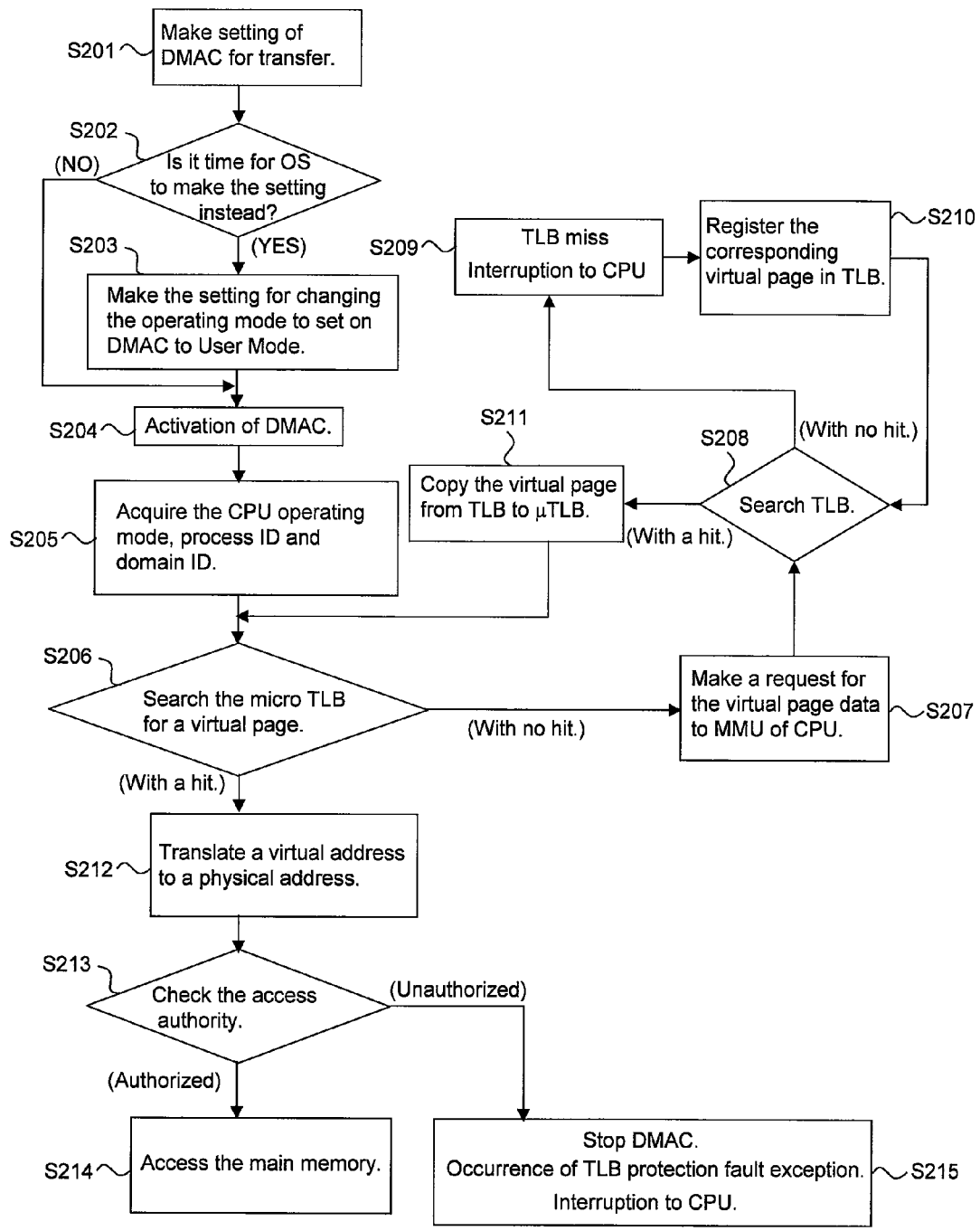
FIG. 6 is a flowchart of data transfer by DMAC 105 involved with the first embodiment.

FIG. 6 is a flowchart of data transfer by DMAC 105.

First, in case of making a transfer request to DMAC 105, CPU 101 provides the transfer control information 109 to DMAC 105 thereby to make the setting of DMAC 105 (S201). At this time, the controller 403 judges whether or not it is time for the operating system to make the setting of a transfer condition on DMAC 105 and activation thereof in place of the user program (S202). If it is judged to be such a time, the controller 403 sets an enable bit on the accessauthority-change-set register 407, thereby to make the setting to change the data-transfer authority from Privileged Mode to User Mode (S203). Thereafter CPU 101 sets, on the DMAC enable register 408, the start bit, whereby DMAC 105 is activated (S204). On the other hand, in the case that the user program makes the setting on DMAC 105 directly, nothing is set on the access-authority-change-set register 407, and Step S204 is put into execution.

At the execution of Step S204, the controller 403 stores, in the identification-information register 404, the identification information of CPU 101 at the time of setting the start bit (S205). At this stage, if the enable bit has been set on the access-authority-change-set register 407, the operating mode is changed from Privileged Mode to User Mode. Then, the controller 403 searches for a translation entry data of a virtual page corresponding to a virtual address of interest using, as an index, part of virtual addresses set by CPU 101 in the step of transfer condition setting, provided that entry data stored in the micro TLB 405 is targeted for the search in this step (S206). If the micro TLB 405 does not have the required translation entry data, the controller 403 sends MMU 102 a signal 110 to make a request for relevant translation entry data (S207). In response to the request signal 110, MMU 102 searches TLB 103 (S208). If the relevant translation entry data is found, MMU 102 copies the translation entry data 111 from TLB 103 to the micro TLB 405 (S211). If the relevant translation entry data is not found, a TLB miss exception is created in the same way as described above (S209), thereby to have CPU 101 register translation entry data of the required virtual page in TLB 103 (S210). Thereafter MMU 102 searches TLB 103 for the relevant translation entry data, again (S208). Then, the translation entry data so registered is hit and as such, the translation entry data 111 is copied from TLB 103 to the micro TLB 405 (S211).

In the case where the micro TLB 405 has required translation entry data, which applies to a situation after the required translation entry data has been copied from TLB 103 to the micro TLB 405 in Step 211, the controller 403 uses the translation entry data hit in the search of Step 206 to translate the virtual address into physical one (S212). Then, the controller 403 compares the identification information corresponding to the resultant physical address with identification information of CPU 101 at the setting of the start bit, which has been stored in the identification-information register 404 (S213). As a result, if the identification information corresponding to the address of interest matches the stored information, the transfer is started (S214), and then DMAC 105 outputs the physical address corresponding to the virtual address of interest, etc. to the system bus 107. In contrast, if the result of the comparison is mismatch, the controller 403 stops data transfer, and issues an interrupt request 113 to the interrupt controller 104 for creating a TLB protection fault exception. On receipt of the interrupt request 113, the interrupt controller 104 sends the interrupt signal 114 to CPU 101, thereby to notify of the occurrence of access authority violation (S215).

As described above, according to the first embodiment, each time a physical address is produced, DMAC 105 confirms that the identification information corresponding to a physical address in question matches identification information of CPU 101 at the setting of a transfer condition. Therefore, it is possible to provide a highly reliable access protection like an access protection for all of addresses associated with data transfer according to set transfer conditions. In addition, using an operating mode, a process ID and a domain ID as the identification information will achieve a higher reliability in access protection. Further, DMAC 105 leverages a subset of identification information which MMU 102 uses for access protection, and consequently diverts the function of MMU 102. Therefore, the software cost can be held down.

Second Embodiment

Figure 7:
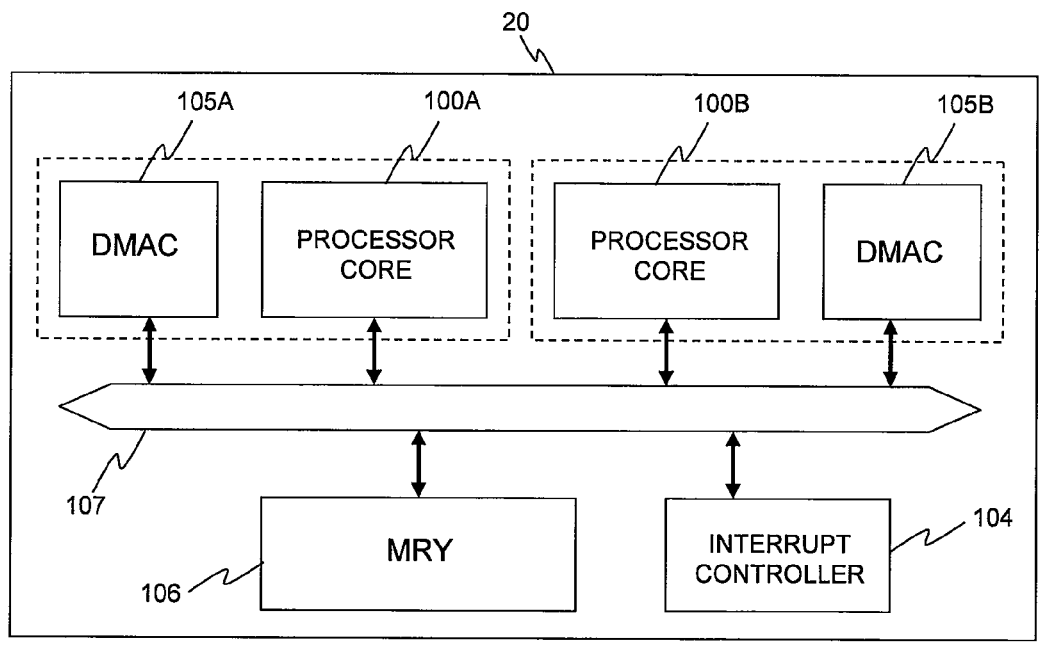
FIG. 7 is a block diagram of a data processor 20 according to the second embodiment of the invention.

FIG. 7 shows a data processor according to another embodiment of the invention, and it is material to a single-chip microcomputer. Although no special restriction is intended, the data processor 20 shown in the drawing is formed on a substrate of semiconductor, such as monocrystalline silicon, by the known manufacturing techniques for manufacturing CMOS ICs.

It is noted that the parts or components of the data processor 20 shown in FIG. 7, which are identical in function with those of the data processor according to the first embodiment, are identified by the same reference numerals or characters to avoid the repetition of the detailed descriptions thereof.

The data processor 20 has a set of a processor core 100A and DMAC 105A, and another set of a processor core 100B and DMAC 105B. Each set is connected to the system bus 107. While the number of such sets shown in FIG. 7 is two apparently, the number is not particularly limited.

The processor cores 100A, 100B include the same components as those the processor core 100 involved with the first embodiment has. Also, DMAC 105A and 105B include the same components as those DMAC 105 involved with the first embodiment has.

In regard to the data processor 20, what is in charge of setting a transfer condition on DMAC 105A, and directing the start of DMAC 105A is only CPU 101 belonging to the same set as DMAC 105A. In the micro TLB 405 placed in DMAC 105A, a subset of the translation entry data held by TLB 103 in the processor core 100A of the same set as DMAC 105A belongs to is stored.

The processor core 100A issues a data transfer request to DMAC 105A belonging to the same set, and DMAC 105A performs an address translation based on the setting by the processor core 100A, and conducts data transfer while offering access protection. The set of the processor core 100B and DMAC 105B operates in the same way.

A specific example of the method of setting a transfer condition, etc. on DMACs 105A and 105B, and a sequence of steps for data transfer by DMACs 105A and 105B are the same as in the first embodiment.

According to the second embodiment, even with a data processor having more than one set of a processor core and a DMAC, the same effect as the first embodiment brings about can be achieved.

Third Embodiment

Figure 8:
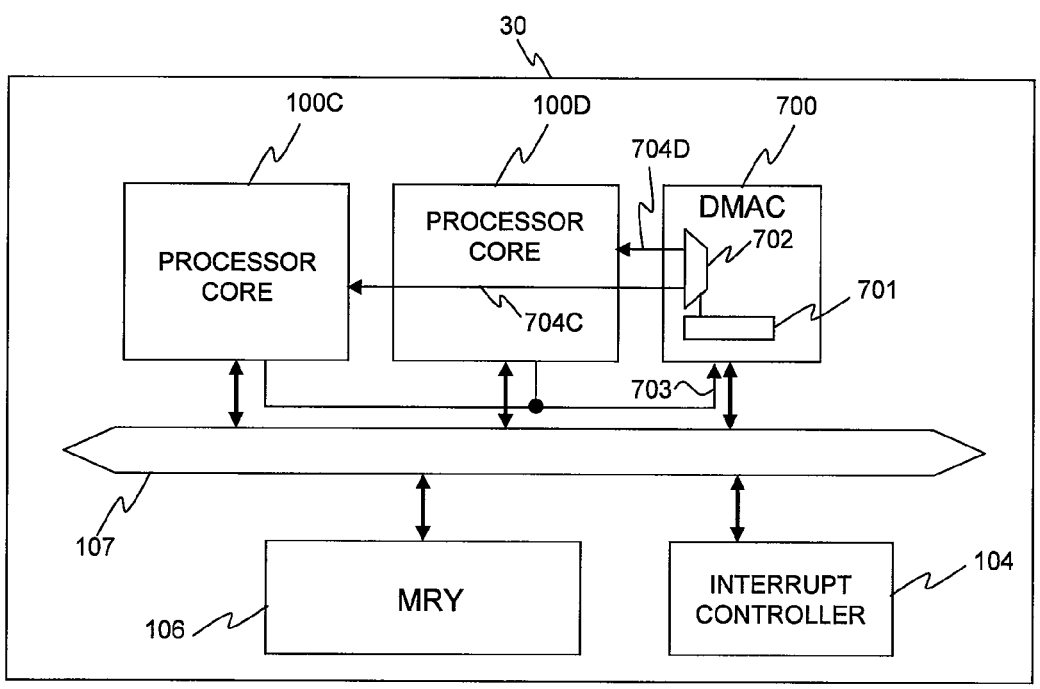
FIG. 8 is a block diagram of a data processor 30 according to the third embodiment of the invention.

FIG. 8 shows a data processor according to another embodiment of the invention, and it is material to a single-chip microcomputer. Although no special restriction is intended, the data processor 30 shown in the drawing is formed on a substrate of semiconductor, such as monocrystalline silicon, by the known manufacturing techniques for manufacturing CMOS ICs.

It is noted that the parts or components of the data processor 30 shown in FIG. 8, which are identical in function with those of the data processor according to the first embodiment, are identified by the same reference numerals or characters to avoid the repetition of the detailed descriptions thereof.

The data processor 30 has processor cores 100C and 100D, in which the processor cores 100C and 100D share one DMAC 700. The blocks of the processor cores are connected to the system bus 107. While the number of processor cores shown in FIG. 8 is two apparently, it just shows a representative example, and the number is not particularly limited.

The processor cores 100C and 100D each include the same components as those of the processor core 100 involved with the first embodiment.

In addition to the same components as those of DMAC 105 involved with the first embodiment, DMAC 700 further includes a CPU identification-information register 701 and a selector 702.

In case that CPU 101 of the processor core 100C or 100D issues a transfer request (703) to DMAC 700, and the start bit is set on the enable register 408 of DMAC 700, the controller 403 stores the identification information of the CPU 101 concerned in the identification-information register 404 and in parallel, puts, in the CPU identification-information register 701, the CPU identification information showing that CPU 101 involved with the activation of DMAC 700 belongs to which processor core.

Stored in the micro TLB 405 are a subset of translation entry data held by TLB 103, and CPU identification information showing that the subset of translation entry data of TLB 103 corresponds to which of the processor cores 100C and 100D.

As described above, after DMAC 700 is put into action, the controller 403 searches for translation entry data of a virtual page corresponding to a relevant virtual address stored in the micro TLB 405 using, as an index, part of a virtual address associated with a transfer request from CPU 101. In the step of the search, the controller 403 searches for translation entry data which matches CPU identification information stored in the CPU identification-information register 701. If the micro TLB 405 does not hold the required translation entry data, the selector 702 selects the processor core 100C or 100D fitting the CPU identification information stored in the CPU identification-information register 701, and supplies MMU 102 in the selected processor core 100C or 100D with a signal 704C or 704D for requesting the required translation entry data of MMU 102 of the selected processor core 100C or 100D. On receipt of the request signal, MMU 102 provides the required translation entry data to the micro TLB 405. For example, in the case where the micro TLB 405 includes no required translation entry data at the time when the processor core 100D makes a transfer request to DMAC 700, the selector 702 provides MMU 102 of the processor core 100D with a signal 704D for requesting the required translation entry data. On receipt of the request signal, MMU 102 of the processor core 100D supplies the micro TLB 405 with the required translation entry data.

Other steps for data transfer which DMAC 700 performs are the same as those carried out according to the first embodiment.

According to the third embodiment, even with a data processor having a plurality of processor cores therein, the same effect as the first embodiment brings about can be achieved.

Fourth Embodiment

Figure 9:
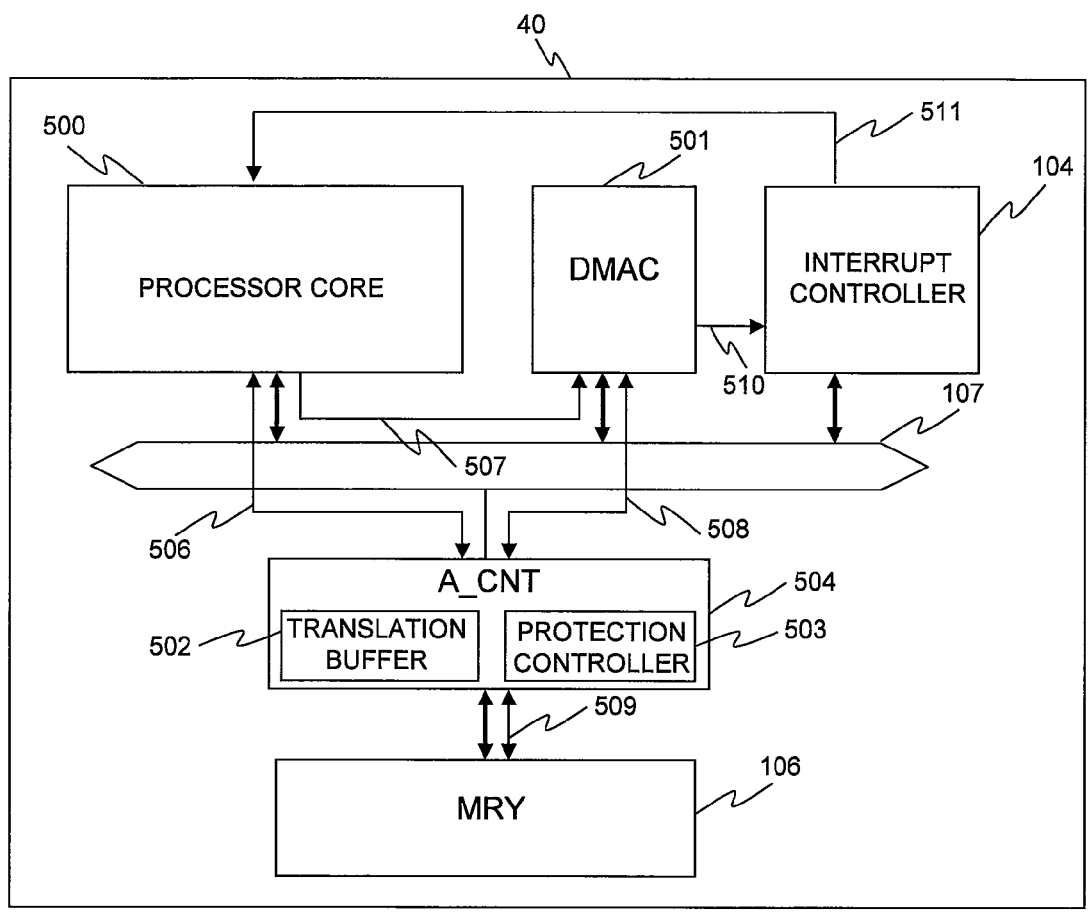
FIG. 9 is a block diagram of a data processor 40 according to the fourth embodiment of the invention.

FIG. 9 shows a data processor according to another embodiment of the invention, and it is material to a single-chip microcomputer. Although no special restriction is intended, the data processor 40 shown in the drawing is formed on a substrate of semiconductor, such as monocrystalline silicon, by the known manufacturing techniques for manufacturing CMOS ICs.

Now, it is noted that the parts or components of the data processor 40 shown in FIG. 9, which are identical in function with those of the data processor according to the first embodiment, are identified by the same reference numerals or characters to avoid the repetition of the detailed descriptions thereof.

The data processor 40 has a processor core 500, DMAC 501 and an access protection device 504, and their blocks are each connected to the system bus 107. Its main memory 106 is connected to the system bus 107 through the access protection device 504. Although this is not shown in the drawing, the system bus 107 is also connected with, e.g., an I/O circuit and other peripheral circuits.

The data processor 40 shown in FIG. 9 is different from the data processors according to the first to third embodiments in that the access protection by MMU is not adopted for the processor core 500. The access protection device 504 controls the access from the processor core 500, DMAC 501 and the like to the main memory 106.

The processor core 500 has the same structure as that of the processor core 100 involved with the first embodiment except that it does not have the memory management section 115. When issuing a request for access to the main memory 106, the processor core 500 outputs, to the system bus 107, identification information including the operating mode, domain ID and process ID of CPU 101 inside the processor core 500 at the time of issue of the access request together with an address for transfer and data to be transferred.

DMAC 501 has the same structure as that of DMAC 105 involved with the first embodiment except that it does not have the micro TLB 405. Like DMAC 105, DMAC 501 captures the identification information of CPU 101 at the time of setting of the start bit by CPU 101. When issuing a request for access to the main memory 106, DMAC 501 outputs the captured identification information of CPU 101 to the system bus 107 together with an address for transfer, data to be transferred, etc.

The access protection device 504 has a translation buffer 502 and a protection controller 503.

The translation buffer 502 holds an information pair of an address for transfer, and identification information corresponding to the address. The information pair is set on the translation buffer 502 at time of power-on reset, for example.

After having received a request for access from the processor core 500 and DMAC 501, the protection controller 503 permits an access concerned on condition that identification information of the information pair corresponding to an address for transfer associated with the request matches the identification information included in the request. Now, the access control will be described in detail with reference to FIGS. 10 and 11.

Figure 10:
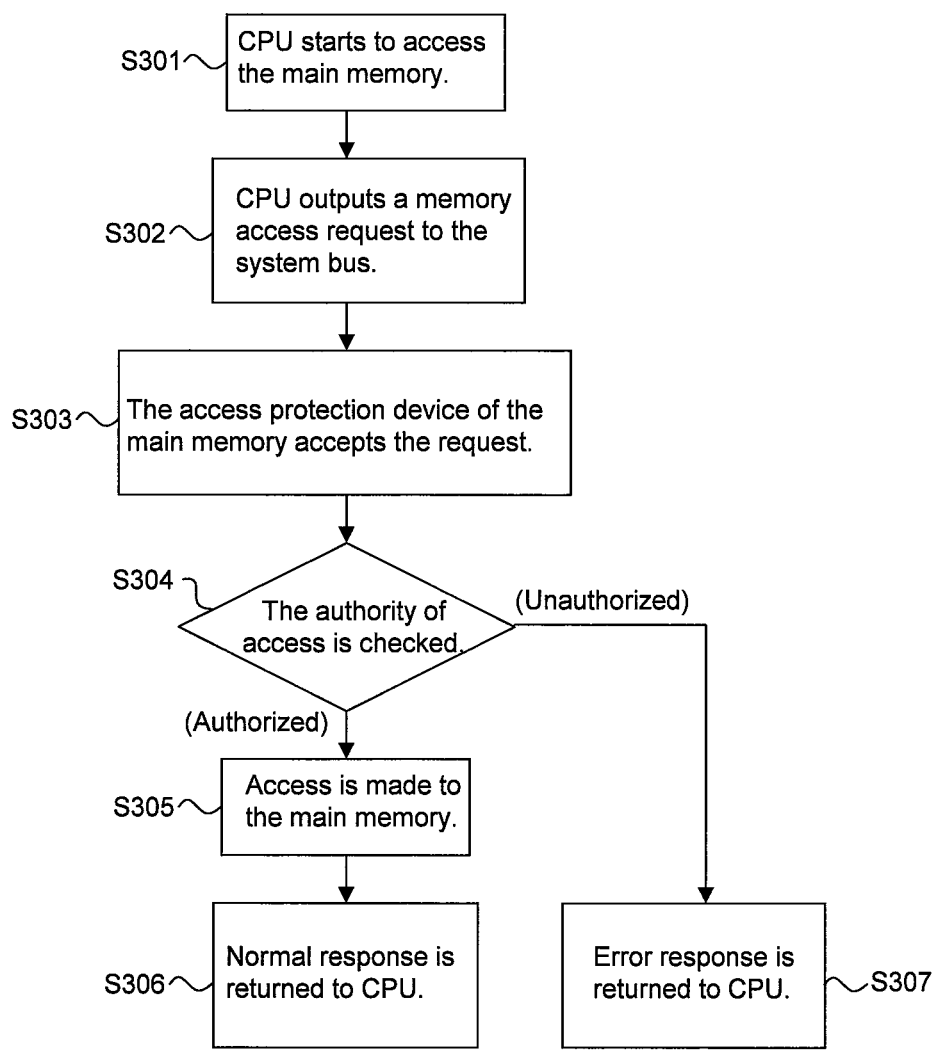
FIG. 10 is a flowchart of access to a main memory 106 by a processor core 500 involved with the fourth embodiment.

FIG. 10 is a flowchart of access to the main memory 106 by the processor core 500.

When CPU 101 of the processor core 500 starts to access the main memory 106 (S301), CPU 101 outputs, as an access request, an address for transfer, data to be transferred, the identification information of CPU 101 at that time to the system bus 107, etc. (S302). Then, the access protection device 504 receives the request output to the system bus 107 (S303). The protection controller 503 in the access protection device 504, which has received the request, makes a comparison between identification information of the information pair corresponding to an address for transfer involved in the request, and the identification information included in the request (S304). If the result of the comparison shows that the two kinds of identification information match each other, the protection controller 503 outputs the request to the main memory 106 (S305), and then outputs a response to the request from the main memory 106 to the processor core 500

(S306). In contrast, if the result is a mismatch, the protection controller 503 does not output the request to the main memory 106, and outputs an error response showing the occurrence of an access authority violation to the processor core 500 (S307).

Next, an example where the processor core 500 activates DMAC 501, and DMAC 501 accesses the main memory 106 will be described with reference to FIG. 11.

Figure 11:
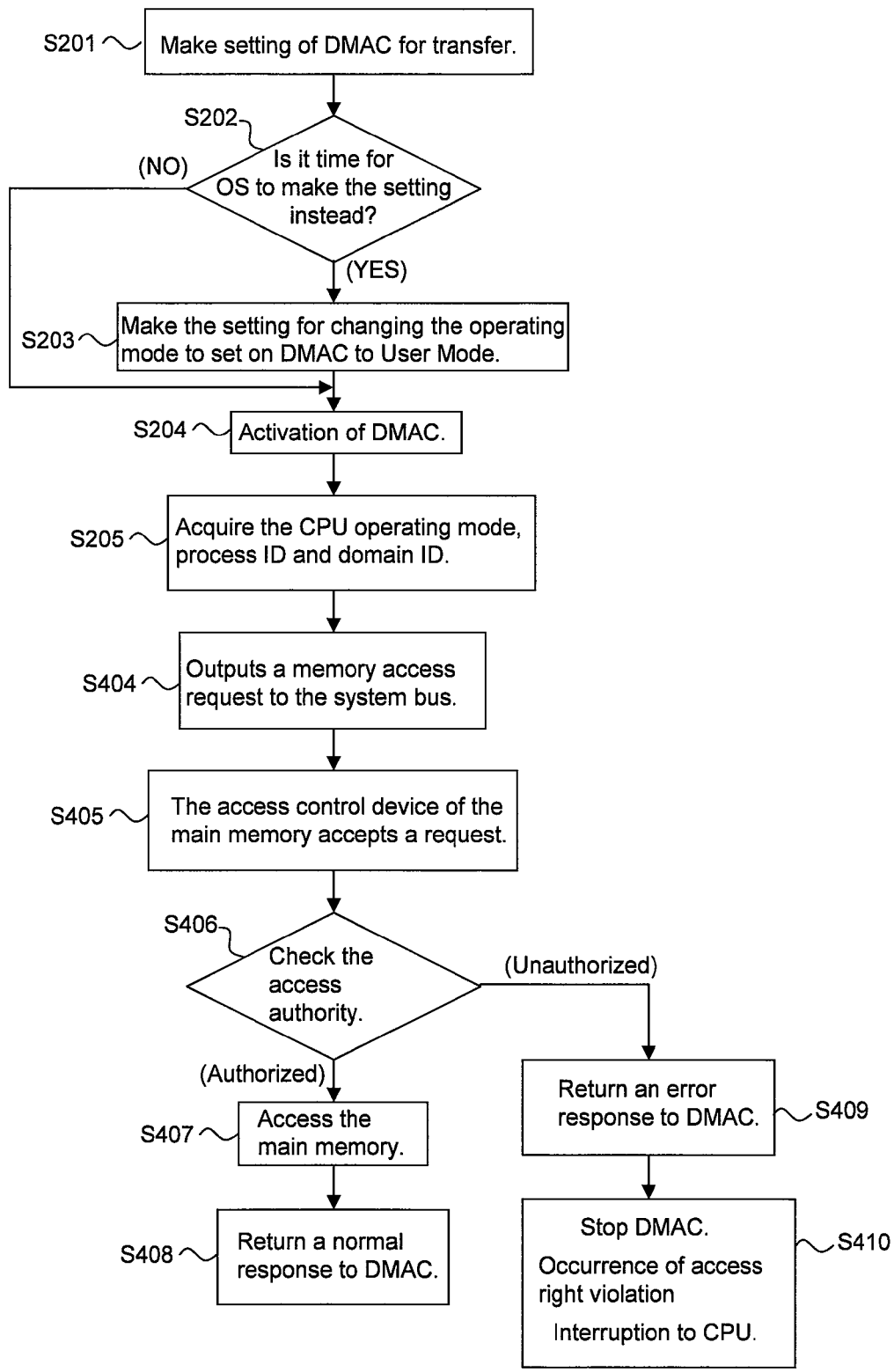
FIG. 11 is a flowchart of access to the main memory 106 by DMAC 501 involved with the fourth embodiment.

FIG. 11 is a flowchart of access to the main memory 106 by DMAC 501.

The flow of the steps (S201-S205), in which DMAC 501 is subjected to the setting of a transfer condition by CPU 101 in the processor core 500 and activated, and acquires the identification information of CPU 101 is the same as the flow of Steps S201 to S205 shown by the flowchart of FIG. 6 in connection with the first embodiment.

After having acquired the identification information, DMAC 501 starts to access the main memory 106 according to the transfer condition set thereon. DMAC 501 outputs, as an access request, an address for transfer, data to be transferred, the identification information of CPU 101 acquired at time of the start thereof, etc. to the system bus 107 (S404). Then, the access protection device 504 accepts the request output to the system bus 107 (S405). The protection controller 503 in the access protection device 504 which has received the request makes a comparison between the identification information of the information pair corresponding to an address for transfer associated with the request, and the identification information included in the request (S406). If the result of the comparison shows that the two kinds of identification information match each other, the protection controller 503 outputs the request to the main memory 106 (S407), and then outputs a response to the request from the main memory 106 to the DMAC 501 (S408). In contrast, if the result is a mismatch, the protection controller 503 does not output the request to the main memory 106, and outputs an error response showing the occurrence of access authority violation to DMAC 501 (S409). On receipt of the error response, DMAC 501 stops the data transfer, and sends an interrupt request 510 to the interrupt controller 104. On receipt of the interrupt request 510, the interrupt controller 104 provides an interrupt signal 511 to the processor core 500, thereby to notify the occurrence of access authority violation thereto (S410).

According to the fourth embodiment, the access protection device 504 performs the access control based on the identification information. Therefore, a highly reliable access control can be achieved even if DMAC 501 has no access protection mechanism.

While the invention made by the inventors has been described above based on the embodiments specifically, the invention is not limited to the described embodiments. It is obvious that various changes and modifications may be made without departing from the scope of the invention.

For example, the first to fourth embodiments are not limited in their application to a multi-operating system. They are applicable to even a single operating system, and a software program which is not under management of a software program of upper hierarchic level. In such cases, the need for a domain ID—a piece of identification information—is eliminated.

While the first to fourth embodiments have been described taking, as an example, an application to a single-chip data processor, they are also applicable to a multi-chip data processor using an external memory. Further, the device to be accessed is not limited to a main memory, and it may be a register of another peripheral circuit and another memory thereof.

As to the fourth embodiment, it is not an indispensable prerequisite whether or not the processor core has an access protection mechanism based on MMU.

What is claimed is:

1. A data processor comprising:
 a central processing unit configured to run a software program;
 a memory management section for address translation from a virtual address in a virtual address space of the central processing unit into a physical address, and for access protection, which has an address translation buffer for holding a plurality of sets of translation entry data, each set including an address translation data pair used in address translation, and identification information for identifying a process of a software program using a virtual address corresponding to the address translation data pair; and
 a transfer controller configured to control data transfer according to transfer control information set by access from the central processing unit, including
 an identification-information-memory unit for holding identification information for identifying a process of a software program which the central processing unit is running at a time setting the transfer control information thereon, and
 an address translation sub-buffer for holding a subset of information held by the address translation buffer,
 wherein the transfer controller outputs a physical address of a transfer target according to the transfer control information when the address translation sub-buffer has the required translation entry data and when identification information corresponding to the physical address matches identification information in the identification-information-memory unit set by the access from the central processing unit, and protects access to the physical address of the transfer target when identification information corresponding to the physical address does not match the identification information in the identification-information-memory unit set by the access from the central processing unit, and
 wherein the memory management section protects access to the physical address when a process attempting to access the virtual address corresponding to the address translation data pair does not match the identification information for identifying the process of the software program using the virtual address corresponding to the address translation data pair in the memory management section.

2. The data processor according to claim 1, wherein the identification information includes a process identifier for identifying a process of a software program run by the central processing unit.

3. The data processor according to claim 2, wherein the identification information includes a domain identifier for identifying a second software program of upper hierarchic level in charge of managing running of the software program.

4. The data processor according to claim 2, wherein the identification information further includes an operating mode identifier showing whether an operating mode of the central processing unit is Privileged Mode or User Mode.

5. The data processor according to claim 1, wherein on condition that the address translation sub-buffer does not have the translation entry data required when the transfer controller produces a physical address of a transfer target according to the transfer control information, the transfer controller makes a request to the memory management section for the required translation entry data, and then the memory management section provides the transfer controller with the translation entry data in response to the request.

6. The data processor according to claim 3, wherein the identification information further includes an operating mode identifier showing whether an operating mode of the central processing unit is Privileged Mode or User Mode.

7. A data processor comprising:
a plurality of central processing units configured to run a software program;
a memory management section for address translation from a virtual address in a virtual address space of the central processing units into a physical address, and for access protection, which has an address translation buffer for holding a plurality of sets of translation entry data, each set including an address translation data pair used in address translation, and identification information for identifying a process of a software program using a virtual address corresponding to the address translation data pair; and
a plurality of transfer controllers configured to control data transfer according to transfer control information set by access from one of the central processing units, including
an identification-information-memory unit for holding identification information for identifying a process of a software program which one of the central processing units is running at a time setting the transfer control information thereon, and
an address translation sub-buffer for holding a subset of information held by the address translation buffer,
wherein the transfer controller outputs a physical address of a transfer target according to the transfer control information when the address translation sub-buffer has the required translation entry data and when identification information corresponding to the physical address matches identification information in the identification-information-memory unit set by the access from the one of the central processing units, and protects access to the physical address of the transfer target when identification information corresponding to the physical address does not match the identification information in the identification-information-memory unit set by the access from the one of the central processing units, and
wherein the memory management section protects access to the physical address when a process attempting to access the virtual address corresponding to the address translation data pair does not match the identification information for identifying the process of the software program using the virtual address corresponding to the address translation data pair in the memory management section, and
wherein each central processing unit is allowed to set the transfer control information only on the transfer controller with which it is associated.

8. A data processor comprising:
a plurality of central processing units configured to run a software program, and
a memory management section for address translation from a virtual address in a virtual address space of the central processing units into a physical address, and for access protection, which has an address translation buffer for holding a plurality of sets of translation entry data, each set including an address translation data pair used in address translation, and identification information for identifying a process of a software program using a virtual address corresponding to the address translation data pair;
a transfer controller shared by the central processing units and memory management section, and configured to control data transfer according to transfer control information set by access from the central processing units, including
an identification-information-memory unit for holding identification information for identifying a process of a software program which the central processing units are running at a time setting the transfer control information thereon, and
an address translation sub-buffer for holding a subset of information held by the address translation buffer,
wherein the transfer controller outputs a physical address of a transfer target according to the transfer control information when the address translation sub-buffer has the required translation entry data and when identification information corresponding to the physical address matches identification information in the identification-information-memory unit set by the access from the central processing units, and protects access to the physical address of the transfer target when identification information corresponding to the physical address does not match the identification information in the identification-information-memory unit set by the access from the central processing units,
wherein the memory management section protects access to the physical address when a process attempting to access the virtual address corresponding to the address translation data pair does not match the identification information for identifying the process of the software program using the virtual address corresponding to the address translation data pair in the memory management section,
wherein the address translation sub-buffer used to produce a physical address of a transfer target according to the transfer control information,
the address translation sub-buffer holds a subset of information kept by the address translation buffer,
on condition that the address translation sub-buffer does not have the translation entry data required when the transfer controller produces a physical address of a transfer target according to the transfer target according to the transfer control information, the transfer controller makes a request to the memory management section for the required translation entry data, and then the memory management section provides the transfer controller with the translation entry data in response to the request, and
at time of producing a physical address of a transfer target according to the transfer control information, the transfer controller holds identification information of the central processing units which have set the transfer control information on the transfer controller, and if the address translation sub-buffer does not have the required translation entry data, makes a request for the required translation entry data to the memory management section of the set which the central processing units corresponding to the identification information belong to.

* * * * *